(12) United States Patent
Renollett et al.

(10) Patent No.: US 10,386,868 B2
(45) Date of Patent: Aug. 20, 2019

(54) PISTON SENSOR WITH BAFFLE PLATE

(71) Applicant: TESCOM CORPORATION, Elk River, MN (US)

(72) Inventors: Jacob T. R. Renollett, Andover, MN (US); Todd W. Larsen, Milaca, MN (US)

(73) Assignee: TESCOM CORPORATION, Elk River, MN (US)

( * ) Notice: Subject to any disclaimer, the term of this patent is extended or adjusted under 35 U.S.C. 154(b) by 0 days.

(21) Appl. No.: 15/199,137

(22) Filed: Jun. 30, 2016

(65) Prior Publication Data

US 2018/0003311 A1 Jan. 4, 2018

(51) Int. Cl.
*G05D 16/10* (2006.01)
*F16K 31/122* (2006.01)

(52) U.S. Cl.
CPC ....... *G05D 16/106* (2013.01); *F16K 31/1223* (2013.01); *Y10T 137/7791* (2015.04)

(58) Field of Classification Search
CPC .. F16K 31/1221; F16K 31/1223; F16K 1/126; F16K 31/1266; G05D 16/106; Y10T 137/7791
USPC ...................................... 137/503; 251/50, 52
See application file for complete search history.

(56) References Cited

U.S. PATENT DOCUMENTS

| | | | | |
|---|---|---|---|---|
| 1,092,806 A | * | 4/1914 | Anderson | G05D 7/03 137/456 |
| 1,581,454 A | * | 4/1926 | Sigfrid | G05D 16/10 137/489 |
| 2,018,130 A | * | 10/1935 | Jauch | F16K 15/02 137/503 |
| 2,146,092 A | * | 2/1939 | Raymond | G05D 16/0655 137/510 |
| 2,158,068 A | * | 5/1939 | Grove | G05D 16/163 137/487 |
| 2,232,538 A | * | 2/1941 | Kriese | F16K 21/10 251/322 |
| 2,340,954 A | * | 2/1944 | Garretson | F02B 79/00 123/579 |
| 2,373,654 A | * | 4/1945 | Beekley | F16K 31/40 251/157 |
| 2,830,784 A | * | 4/1958 | Placette | F16K 31/363 251/14 |
| 3,088,487 A | * | 5/1963 | Peters | F16K 31/363 137/503 |

(Continued)

*Primary Examiner* — Robert K Arundale
*Assistant Examiner* — Jonathan J Waddy
(74) *Attorney, Agent, or Firm* — Marshall, Gerstein & Borun LLP

(57) ABSTRACT

A valve assembly includes a sensing cavity and a piston cavity defined in valve body and/or in a bonnet. A piston head of a piston may be disposed within the piston cavity, and a piston stem has an end portion in contact with valve plug. A baffle plate has a first surface defining a portion of the sensing cavity and a second surface defines a portion of the piston cavity. The baffle plate includes at least one baffle aperture such that the sensing cavity is in fluid communication with the piston cavity, and pressure in the sensing cavity acts on a surface of the piston head to displace the piston and the valve plug between an open and closed position. The at least one baffle aperture is adapted to restrict the flow of fluid between the sensing cavity and the first working volume.

16 Claims, 6 Drawing Sheets

(56) References Cited

U.S. PATENT DOCUMENTS

| | | | | |
|---|---|---|---|---|
| 4,915,126 A | * | 4/1990 | Gyllinder | F04B 45/053 |
| | | | | 137/495 |
| 5,722,454 A | * | 3/1998 | Smith | F16K 17/34 |
| | | | | 137/244 |
| 2008/0251142 A1 | * | 10/2008 | Ogino | F04B 49/03 |
| | | | | 137/512.3 |
| 2016/0139613 A1 | * | 5/2016 | Brunner | B29C 49/36 |
| | | | | 264/523 |

* cited by examiner

PISTON SENSOR WITH BAFFLE PLATE

FIELD OF THE DISCLOSURE

This disclosure relates generally to valves, and more particularly, to valves having a piston sensor.

BACKGROUND

Valve assemblies, such as regulator valve assemblies, may be used to regulate pressure flowing from an inlet to an outlet across the valve assembly. In some embodiments, the valve assembly may have a piston disposed in a sensing cavity, and process pressure (e.g., pressure at the inlet of the valve assembly) may be introduced into the sensing cavity to act on a surface of the piston such that the piston senses the process pressure. Accordingly, an increase or decrease in process pressure may cause the piston to upwardly or downwardly displace. Because the piston is coupled to a valve plug disposed between the inlet and outlet, displacement of the piston causes the valve plug to move into and out of sealing engagement with a valve seat in a desired manner. Accordingly, by choosing an appropriate area for the surface of the piston and an appropriate spring to provide a biasing force on the valve plug in a direction opposing the force on the piston, process pressure at the outlet of the valve assembly can be limited or otherwise regulated. However, in processes with high flow rates and/or high inlet pressures, the pressure forces acting on the surface of the piston can oscillate or change greatly as an absolute value and/or as a function of time, thereby creating possibility that the piston (and the valve plug) could oscillate uncontrollably and cause the valve assembly to fail.

BRIEF SUMMARY OF THE DISCLOSURE

A valve assembly includes a valve body having an inlet, an outlet, and a valve seat disposed between the inlet and outlet. A valve plug is movably disposed within a body cavity defined in the valve body, the body cavity being disposed between the inlet and the outlet. The valve plug is displaceable along a body axis between a closed position in which a sealing surface of the valve plug sealingly engages a sealing surface of the valve seat and a fully-open position in which the sealing surface of the valve plug is offset from the sealing surface of the valve seat. The valve assembly further includes a sensing cavity defined in the valve body or in a bonnet coupled to the valve body and a piston cavity defined in the valve body or in the bonnet coupled to the valve body. The piston cavity extends from a first end to a second end along the body axis, the piston cavity being partially defined by a cavity side wall that extends from the first end to the second end of the piston cavity. The valve assembly additionally includes a piston having a piston head disposed within the piston cavity, the piston head having a first surface and a second surface, the piston head sealingly engaging the cavity side wall of the piston cavity. A first working volume is defined by the first surface of the piston head and a portion of the piston cavity extending along the body axis between the first end of the piston cavity and the first surface of the piston head. The piston includes a piston stem that extends along a piston axis from a first end to a second end, the first end of the piston stem being coupled to the piston head and the second end of the piston stem being disposed within the body cavity. The valve assembly additionally includes a baffle plate disposed between the sensing cavity and the piston cavity, the baffle plate having a first surface and a second surface. The first surface defines a portion of the sensing cavity and the second surface defines a portion of the piston cavity. The baffle plate includes at least one baffle aperture extending between the first surface and the second surface such that the sensing cavity is in fluid communication with the first working volume of the piston cavity such that pressure in the sensing cavity that is communicated to the first working volume of the piston cavity acts on the first surface of the piston head of the piston to displace the piston towards the valve plug, thereby displacing the sealing surface of the valve plug away from the sealing surface of the valve seat. The at least one baffle aperture is adapted to restrict the flow of fluid between the sensing cavity and the first working volume and thereby eliminate extreme pressure variations acting on the piston head.

DETAILED DESCRIPTION

Figure 1:
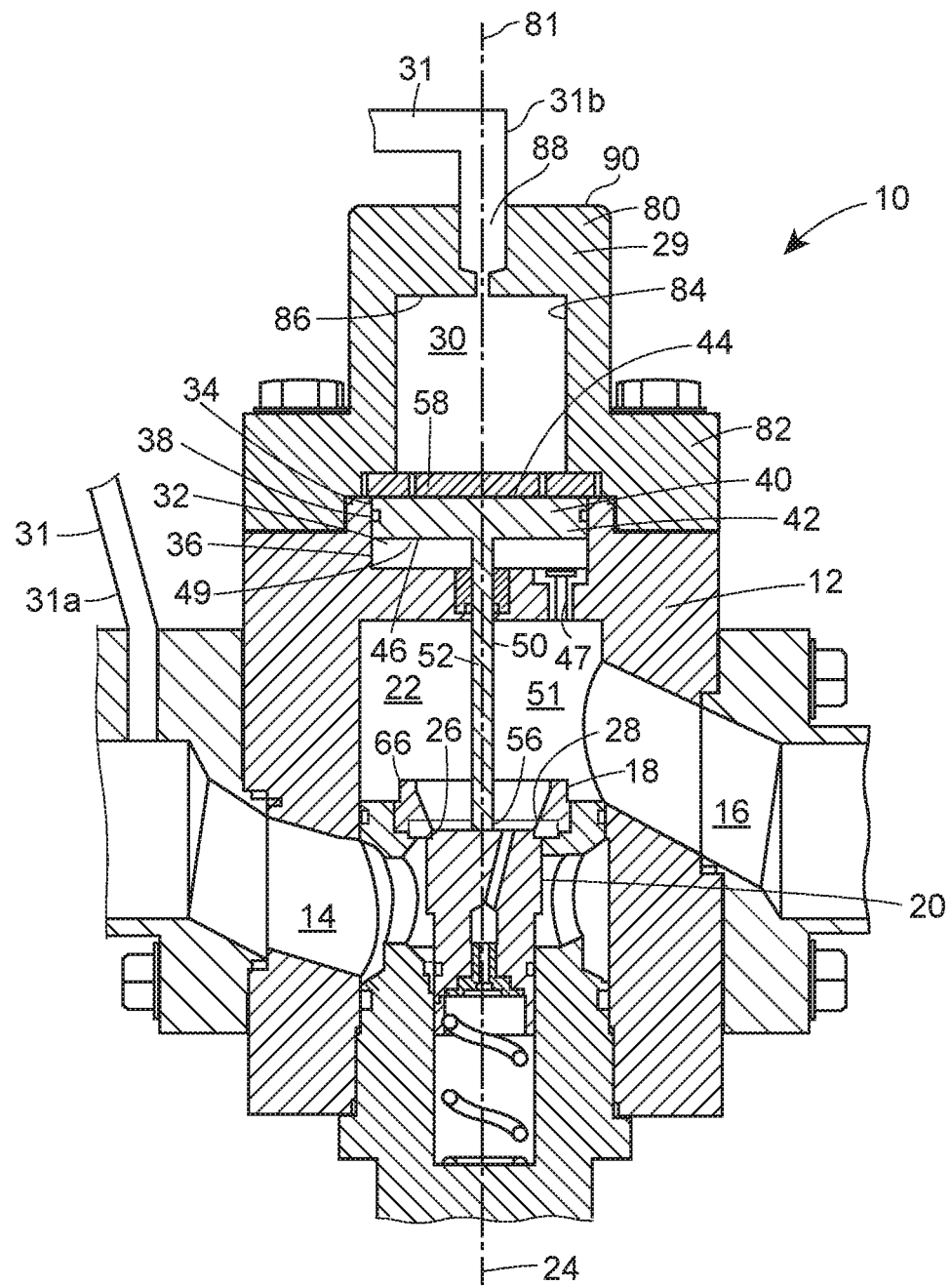
FIG. 1 is a sectional view of an embodiment of a valve assembly with a valve plug in a closed position.

As illustrated in FIG. 1, a valve assembly 10 includes a valve body 12 having an inlet 14, an outlet 16, and a valve seat 18 disposed between the inlet 14 and outlet 16. A valve plug 20 is movably disposed within a body cavity 22 defined in the valve body 12, the body cavity 22 being disposed between the inlet 14 and the outlet 16. The valve plug 20 is displaceable along a body axis 24 between a closed position (illustrated in FIG. 1) in which a sealing surface 26 of the valve plug 20 sealingly engages a sealing surface 28 of the valve seat 18 and a fully-open position (illustrated in FIG. 2) in which the sealing surface 26 of the valve plug 20 is offset from the sealing surface 28 of the valve seat 18. A sensing cavity 30 is defined in the valve body 12 (or in a bonnet 29 coupled to the valve body 12), and the sensing cavity 30 may be in fluid communication with the inlet 14 of the valve body 12 by sensing passage 31, for example. A regulator (not shown) may be disposed along the sensing passage 31 such that pressure in the sensing cavity 30 is less than (but proportional to) pressure at the inlet 14. In some embodiments, the sensing cavity 30 may receive working fluid independent of process fluid flowing form the inlet 14 to the outlet 16, and the working fluid may be provided to be proportional to process fluid pressure at the inlet 14 (or outlet 16), for example.

Figure 6:
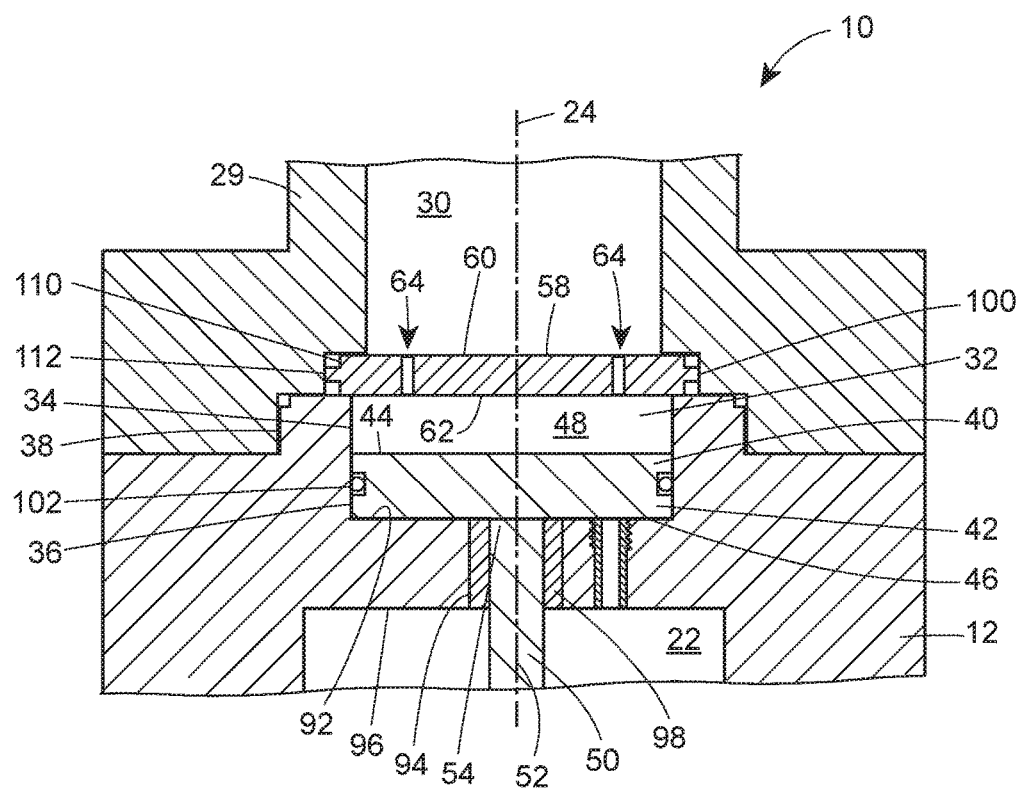
FIG. 6 is a partial sectional view of the embodiment of the valve assembly of FIG. 2.
Figure 7:
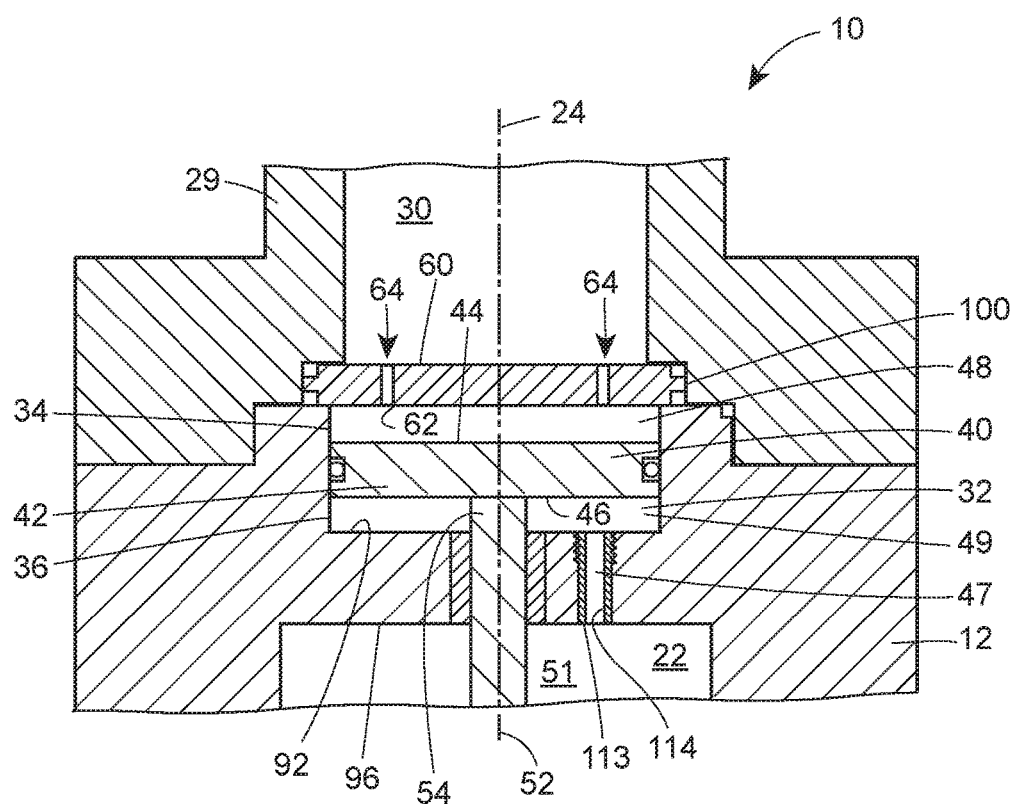
FIG. 7 is a partial sectional view of the embodiment of the valve assembly of FIG. 2 with the valve plug between a closed position and a fully-open position.

Still referring to FIG. 1, a piston cavity 32 is defined in the valve body 12 (or in a bonnet 29 coupled to the valve body 12), and as illustrated in FIG. 6, the piston cavity 32 extends from a first end 34 to a second end 36 along the body axis 24. The piston cavity 32 is partially defined by a cavity side wall 38 that extends from the first end 34 to the second end 36 of the piston cavity 32. Still referring to FIG. 6, the valve assembly 10 also includes a piston 40 having a piston head 42 disposed within the piston cavity 32, the piston head 42 having a first surface 44 (e.g., a top surface 44) and a second surface 46 (e.g., a bottom surface 46), the piston head 42 sealingly engaging the cavity side wall 38 of the piston cavity 32. A first working volume 48 may be at least partially defined by the first surface 44 of the piston head 42 and a portion of the piston cavity 32 extending along the body axis 24 between the first end 34 of the piston cavity 32 and the first surface 44 of the piston head 42. As illustrated in FIG. 7, a second working volume 49 may be at least partially defined by the second surface 46 of the piston head 42 and a portion of the piston cavity 32 extending along the body axis 24 between the second surface 46 of the piston head 42 and the second end 36 of the piston cavity 32. The second working volume 49 of the piston cavity 32 may be in fluid communication with the body cavity 22 (e.g., a portion 51 of the body cavity 22 in fluid communication with the outlet 16) by a piston cavity inlet 47 that extends between the piston cavity (e.g., the second working volume 49 of the piston cavity 32) and the body cavity 22. The first working volume 48 is sealed from the second working volume 49 (e.g., by the piston head 42 of the piston, as will be described in more detail below) such that the first working volume 48 is not in fluid communication with the second working volume 49. Referring to FIG. 1, the piston 40 also includes a piston stem 50 that extends along a piston axis 52 from a first end 54 to a second end 56, the first end 54 of the piston stem 50 being coupled to the piston head 42 and the second end 56 of the piston stem 50 being disposed within the body cavity 22.

As illustrated in FIG. 6, the valve assembly 10 further includes a baffle plate 58 disposed between the sensing cavity 30 and the piston cavity 32, the baffle plate 58 having a first surface 60 (e.g., a top surface 60) and a second surface 62 (e.g., a bottom surface 62). The first surface 60 defines a portion of the sensing cavity 30 and the second surface defines a portion of the piston cavity 32. The baffle plate 58 includes at least one baffle aperture 64 extending between the first surface 60 and the second surface 62 such that the sensing cavity 30 is in fluid communication with the first working volume 48 of the piston cavity 32 such that pressure in the sensing cavity 30 that is communicated to the first working volume 48 of the piston cavity 32 acts on the first surface 44 of the piston head 42 of the piston 40 to displace the piston 40 towards the valve plug 20, thereby displacing the sealing surface 26 of the valve plug 20 away from the sealing surface 28 of the valve seat 18.

So configured, the at least one baffle aperture 64 is adapted to eliminate extreme pressure variations between the sensing cavity 30 and the first working volume 48. More specifically, when large pressure increases are communicated to the second working volume 49 due to variations in high flow rates at the outlet 16, the pressure increase in the second working volume 49 applies a corresponding force to the second surface 46 of the piston head 42 that tends to bias or forces the piston head 42 towards the first end 34 of the piston cavity 32 (i.e., upwards, or in a direction along or parallel to the body axis 24 from the second end 56 of the piston stem 50 towards the first end 54 of the piston stem 50). The at least one baffle aperture 64 acts to restrict or limit the flow of fluid from the first working volume 48 of the piston volume 32 into the sensing cavity 30 to provide a volume of fluid that dampens the upward movement of the piston head 42 of the piston 40. Accordingly, extreme oscillations due to pressure variations at the outlet 16 acting on the piston head 42 of the piston 40 causing the piston 40 (and valve assembly 10) to go unstable are eliminated.

Figure 2:
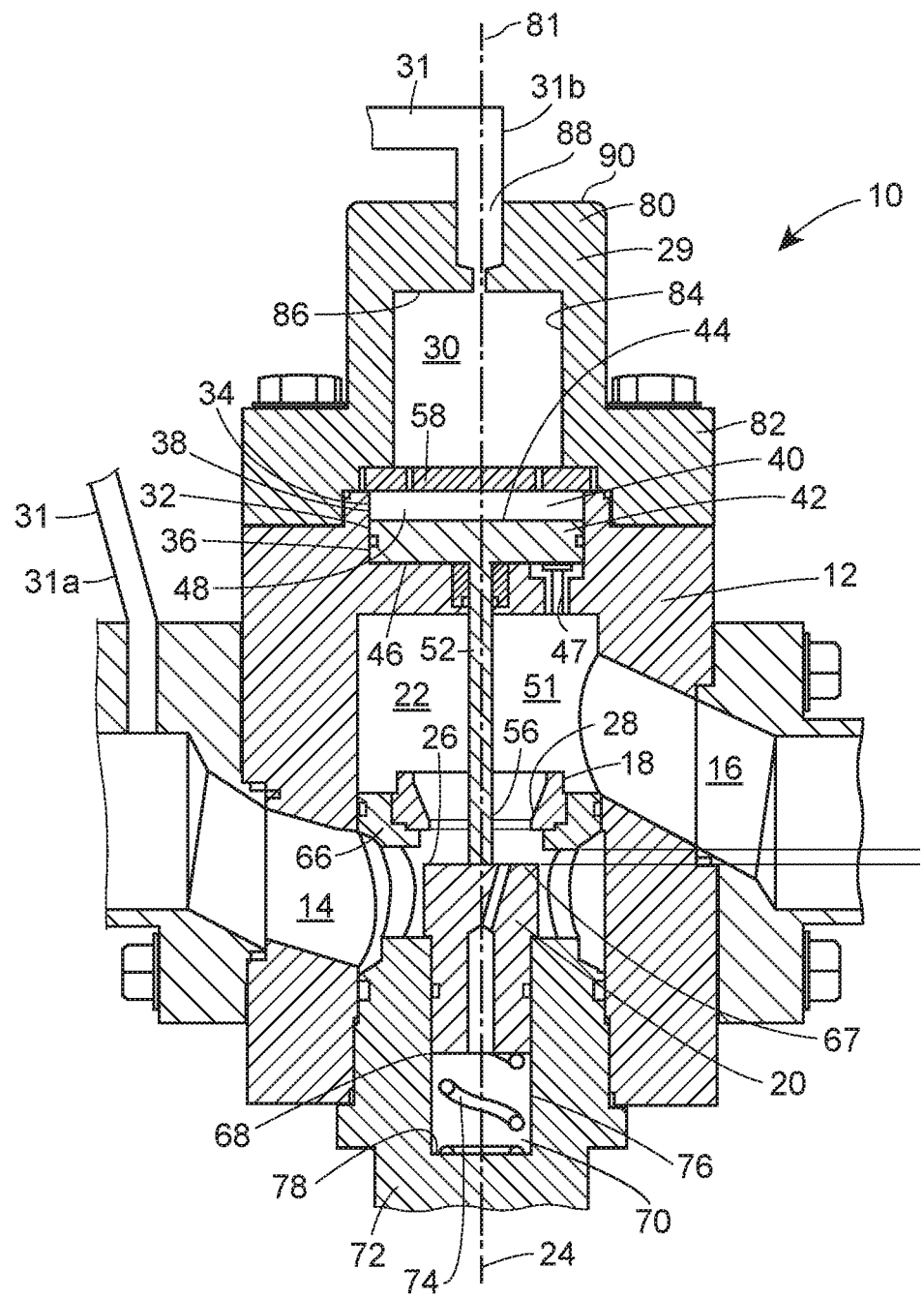
FIG. 2 is a sectional view of the embodiment of the valve assembly of FIG. 1 with the valve plug in a fully open position.
Figure 3:
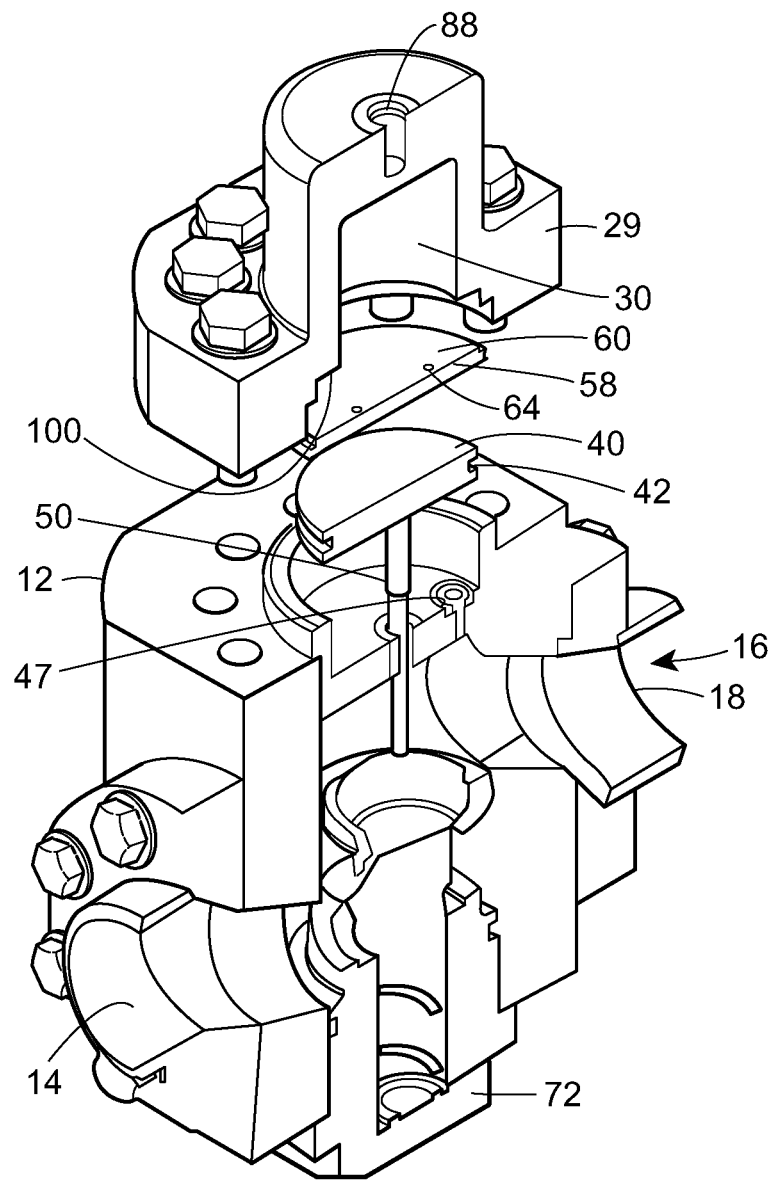
FIG. 3 is an exploded, sectional perspective view of the embodiment of the valve assembly of FIG. 1.
Figure 4:
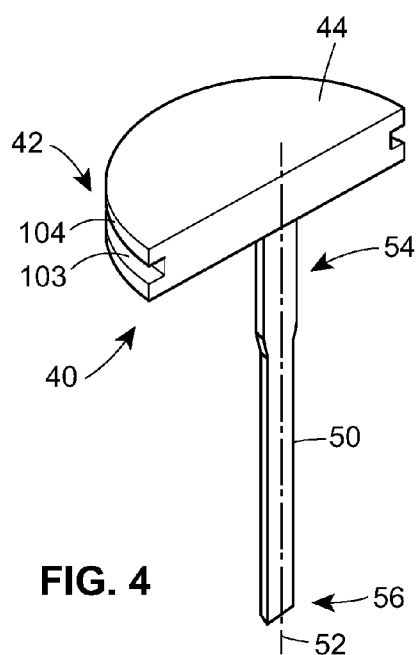
FIG. 4 is a sectional, perspective view of an embodiment of a piston of the valve assembly of FIG. 1.

Turning to the valve assembly 10 in more detail, the valve body 12 is illustrated in FIGS. 1 and 2 and includes or defines the inlet 14 and the outlet 16. The body cavity 22 may also be defined within the valve body 12, and the body cavity 22 may be in fluid communication with the inlet 14 and outlet 16. The body cavity 22 may be elongated and may extend along the body axis 24. The valve seat 18 may be disposed within the body cavity 22 between the inlet 14 and outlet 16, and the valve seat 18 may be a portion of a seat ring 66 that may be removably disposed within the body cavity 22.

The valve plug 20 may be movably or displaceably disposed within the body cavity 22 and may be displaceable about the body axis 24 from (or between) the closed position illustrated in FIG. 1 and a fully-open position illustrated in FIG. 2. In the closed position, the sealing surface 26 of the valve plug 20 sealingly engages a sealing surface 28 of the valve seat 18. In such a closed position, fluid is prevented from flowing from the inlet to the outlet 16. As illustrated in FIG. 2, in the fully-open position, the sealing surface 26 of the valve plug 20 is offset from the sealing surface 28 of the valve seat 18, and fluid flows from the inlet to the outlet 16 within the gap between the sealing surface 26 of the valve plug 20 and the sealing surface 28 of the valve seat 18. In the fully-open position, the sealing surface 26 of the valve plug 20 may be offset from the sealing surface 28 of the valve seat 18 by a distance D1 that extends parallel to or along the body axis 24.

As illustrated in FIG. 2, the valve plug 20 may extend along the body axis 24 from a first end 67 to a second end 68, and the sealing surface 26 of the valve plug 20 may be disposed at or adjacent to the first end 67. The second end 68 of the valve plug 20 may be disposed in a plug cavity 70 at least partially formed in a bottom member 72 secured to the valve body 12, and the plug cavity 70 may be defined by a cylindrical side wall 76 and a planar bottom surface 78. A resilient member 74 (such as a coil spring) may be disposed between the second end 68 of the valve plug 20 and bottom surface 78 of the plug cavity 70, and the resilient member 74 may acts on a surface of the second end 68 of the valve plug 20 to bias the first end 67 of the valve plug 20 towards the valve seat 18 and/or to bias the sealing surface 26 of the valve plug 20 into sealing engagement with the sealing surface 28 of the valve seat 18.

As illustrated in FIGS. 1, 2, 3, and 6, the valve assembly 10 also includes a sensing cavity 30. The sensing cavity 30 may be defined in the valve body 12 or at least partially in the valve body 12. Alternatively (or in addition), the sensing cavity 30 may be defined in the bonnet 29 or at least partially in the bonnet 29. The bonnet 29 may have any suitable shape and may be secured to any suitable portion of the valve body 12. For example, as illustrated in FIG. 2, the bonnet 29 may extend along a bonnet axis 81 that is coaxially aligned with the body axis 24 from a first end 80 to a second end 82, and the second end 82 may be secured to a portion of the valve body 12. An internal sidewall 84 may extend along the bonnet axis 81, and the internal sidewall 84 may at least partially define the sensing cavity 30. The internal sidewall 84 may have any suitable shape or combination of shapes, and the internal sidewall 84 may be cylindrical, for example. The sensing cavity 30 may also be partially defined by a transverse surface 86 that may be disposed between the first end 80 and the second end 82 and extend normal to the bonnet axis 81. The transverse surface 86 may be planar or hemispherical, for example. A sensing cavity inlet 88 may extend through a portion of the bonnet 29 and into fluid communication with the sensing cavity 30. For example, the sensing cavity inlet 88 may extend between an upper surface 90 of the bonnet 20 (dispose at or adjacent to the first end 80) of the bonnet 29 and the transverse surface 86, and the sensing cavity inlet 88 may extend along the bonnet axis 81.

The sensing cavity 30 may be in fluid communication with the inlet 14 or the outlet 16 of the valve body 12. For example, as will be described in more detail in the following sections, a sensing passage 31 may extend between the inlet 14 or outlet 16 of the valve body 12 and the sensing cavity inlet 88 such that pressure at the inlet 14 or the outlet 16 of the valve body 12 is communicated through the sensing passage 31 and into the sensing cavity 30. As previously explained, a regulator (not shown) may be disposed along the sensing passage 31 such that pressure in the sensing cavity 30 is less than (but proportional to) pressure at the inlet 14. However, the sensing cavity 30 may be pressurized by a source of fluid (not shown) that is separate from the process fluid flowing from the inlet 14 of the valve body 12 to the outlet 16 of the valve body 12. The pressure provided by the source of fluid may be proportional to process fluid pressure at (or upstream from) the inlet 14 or at (or downstream from) outlet 16, for example. Still referring to FIG. 2, the valve assembly 10 may include the piston cavity 32 that may be defined in the valve body 12 or at least partially within the valve body 12. As illustrated in FIG. 6, the piston cavity 32 may extend from a first end 34 to a second end 36 along the piston axis 52 and/or the body axis 24. The piston cavity 32 may be partially defined by a cavity side wall 38 that extends from the first end 34 to the second end 36 of the piston cavity 32. The cavity side wall 38 may have any suitable shape to accommodate the piston head 42 of the piston 40 and allow the piston head 42 to displace along the piston axis 52 and/or the body axis 24 while the piston head sealingly engages the cavity side wall 38. That is, the piston head 42 may have a cross-sectional shape (when viewed along the piston axis 52 and/or the body axis 24) that corresponds to a cross-sectional shape of the cavity side wall 38 (when viewed along the piston axis 52 and/or the body axis 24). In some embodiments, the cavity side wall 38 may have a cylindrical shape and may have a circular cross-section (when viewed along the piston axis 52 and/or the body axis 24) having a diameter that may be 2% to 10% greater than a corresponding diameter of a cylindrical piston head 42. The cavity side wall 38 may also have a diameter that may be 10% to 20% greater than a corresponding diameter of the sensing cavity 30 such that a recess 100 is formed in the valve body 12 and/or the bonnet 29 that may receive a portion of the baffle plate 58. The piston cavity 32 may also be partially defined by a cavity end wall 92 disposed at the second end of the piston cavity 32. The cavity end wall 92 may be planar and may be normal to the piston axis 52 and/or the body axis 24.

Still referring to FIG. 6, a stem bore 94 may extend through the cavity end wall 92 from the cavity end wall 92 to an end wall 96 of the body cavity 22. The stem bore 94 may receive a bushing 98 that may extend the entire length of the stem bore 94 along the piston axis 52, and the bushing 98 may have an inner diameter that corresponds in shape and size to a corresponding outer diameter of the piston stem 50. For example, if the piston stem 50 has a circular cross-sectional shape (when viewed along the piston axis 52), the inner diameter of the bushing 98 may also have a circular cross-sectional shape (when viewed along the piston axis 52), and the bushing 98 may have having a diameter that may be 2% to 10% greater than the corresponding diameter of the piston stem 50. The bushing 98 may sealingly engage portion an outer surface of the piston stem 50 such that as the piston stem 50 displaces along the piston axis 52 relative to the stationary bushing 98, fluid in the body cavity is prevented from entering the piston cavity 32. In addition, as illustrated in FIG. 7, the piston cavity inlet 47 may extend through the cavity end wall 92 from the cavity end wall 92 to an end wall 96 of the body cavity 22, and the piston cavity inlet 47 may place the second working volume 49 in fluid communication with the portion 51 of the body cavity 22 in fluid communication with the outlet 16. The piston cavity inlet 47 may have any suitable cross-sectional shape, and may have a circular cross-sectional shape having a diameter that may be between 2% and 20% of a diameter of the cavity side wall 38 of the piston volume 32. An insert 113 may be coupled to the valve body and may have an inner surface 114 that defines the piston cavity inlet 47.

As illustrated in FIGS. 1 to 4 and 6, the valve assembly 10 also includes the piston 40 the piston head 42 disposed within the piston cavity 32. As previously explained, the piston head 42 may have any suitable shape to correspond to the piston cavity 32, and the piston head 42 may be cylindrical and may sealingly engage the cavity side wall 38 of the piston cavity 32 to seal the first working volume 48 from the second working volume 49. That is, an annular seal 102 (illustrated in FIG. 6) may be disposed within a recess 103 (illustrated in FIG. 4) formed around a side surface 104 of the piston head 42, and the annular seal 102 may slidingly and sealingly engage the cavity side wall 38 of the piston cavity 32.

Referring to FIG. 1, the piston 40 also includes the piston stem 50 that extends along the piston axis 52 from the first end 54 to the second end 56. The first end 54 of the piston stem 50 is coupled to the second surface 46 of the piston head 42 and the second end 56 of the piston stem 50 is disposed within the body cavity 22. More specifically, as illustrated in FIG. 2, the second end 56 of the piston stem 50 may be biased into contact with a portion of the first end 66 of the valve plug 20 by the resilient member 74 and/or by pressure within the piston cavity 32 (or the first working volume 48) acting on the first surface 44 of the piston head 42. As illustrated in FIG. 6, a portion of the piston stem 50 is disposed through the bushing 98. As previously explained, the piston stem 50 may have a circular cross-section, and the circular cross-section may have a diameter that may be between 25% and 5% of a corresponding diameter of a circular cross-section of the piston head 42.

Figure 5A:
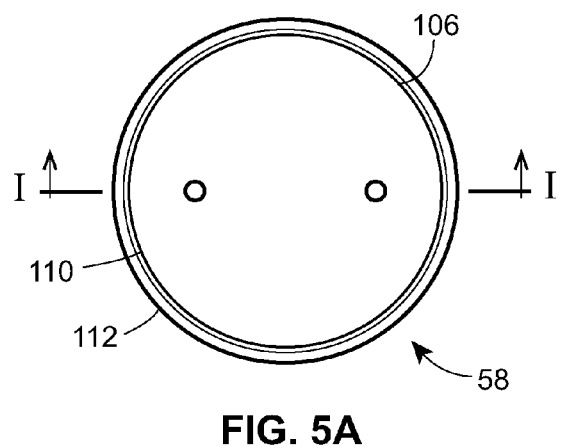
FIG. 5A is a top view of the embodiment of a baffle plate of the valve assembly of FIG. 1.
Figure 5B:
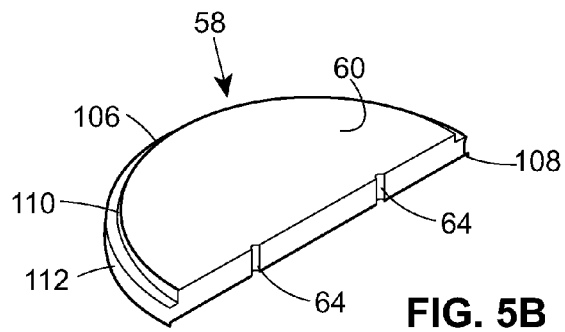
FIG. 5B is a sectional perspective view of the embodiment of the baffle plate of FIG. 5A.
Figure 5C:
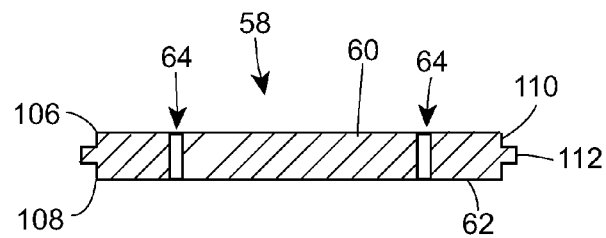
FIG. 5c is a sectional view of the embodiment of the baffle plate of FIG. 5A taken along line II of FIG. 5A.

As illustrated in FIGS. 5A, 5B, 5C, and 6, the valve assembly 10 further includes the baffle plate 58 disposed between the sensing cavity 30 and the piston cavity 32. Referring to FIG. 2, the baffle plate 58 includes the first surface 60 (e.g., the top surface 60) and the second surface 62 (e.g., the bottom surface 62). The baffle plate 58 may be disposed (e.g., removal disposed) within a portion of the valve body 12 and/or a portion of the bonnet 29 between the sensing cavity 30 and the piston cavity 32, and the first surface 60 may define a portion of the sensing cavity 30 and the second surface may define a portion of the piston cavity 32. Referring to FIG. 5C, each of the first surface 60 and the second surface 62 of the baffle plate 58 may be planar or substantially planar, and the first surface 60 may have a first perimeter edge 106 and the second surface 62 may have a second perimeter edge 108. The first perimeter edge 106 and the second perimeter edge 108 may have any suitable shape. For example, the first perimeter edge 106 and the second perimeter edge 108 may each have a circular shape having identical or substantially identical diameters such that the baffle plate 58 has the shape of a disc. The first perimeter edge 106 and the second perimeter edge 108 may each have a diameter that is greater than (e.g., 5% to 20% greater than) the diameter of the cavity side wall 38 of the piston cavity 32 (illustrated in FIG. 6). A side surface 110 may be defined by the first perimeter edge 106 and the second perimeter edge 108, and the side surface 110 may be cylindrical or substantially cylindrical and may be coaxially aligned with the body axis 24 and/or the piston axis 52. A perimeter rib 112 may extend outward from the side surface 110. As illustrated in FIG. 6, the perimeter rib 112 and the side surface 110 may be disposed within the recess 100 formed in the valve body 12 and/or the bonnet 29, and the perimeter rib 112 may contact or be adjacent to a circumferential surface (e.g., cylindrical surface) of the recess 100 to prevent or limit lateral movement of the baffle plate 58 relative to the valve body 12 and/or the bonnet 29.

As illustrated in FIG. 2, the baffle plate 58 includes at least one baffle aperture 64 extending between the first surface 60 and the second surface 62 such that the sensing cavity 30 is in fluid communication with the piston cavity 32 (and, more specifically, with the first working volume 48 of the piston cavity 32). In some embodiments, the baffle plate 58 includes at least two baffle apertures 64, and may include a plurality of baffle apertures 64. Each baffle aperture 64 may extend along an axis that may be parallel to and offset from the body axis 24 and/or the piston axis 52. Each baffle aperture 64 may have any suitable shape that suitably dampens pressure variations between the sensing cavity 30 and the piston cavity 32. For example, each baffle aperture 64 may be cylindrical and may have a diameter that is less than 10% (or between 2% and 10%) of the diameter of the first perimeter edge 106 and/or the second perimeter edge 108 of the baffle plate 58. In some embodiments, one or more of the baffle apertures 64 may have a non-circular cross-sectional shape, and a diameter of a circle that circumscribes (or generally circumscribes) the cross-sectional shape of the baffle aperture 64 may be an effective diameter. The diameter (or the effective diameter) may have a fixed size or may be adjustable from a first diameter (or a first effective diameter) to a second diameter (or a second effective diameter) that is greater than the first diameter (or the first effective diameter).

As illustrated in FIG. 6, the first working volume 48 may be at least partially defined by the first surface 44 of the piston head 42 and a portion of the piston cavity 32 extending along the body axis 24 (and/or piston axis 52) between the first end 34 of the piston cavity 32 and the first surface 44 of the piston head 42. The first working volume 48 may also be partially defined by a volume defined by (or within) each of the baffle apertures 64 (i.e., a volume between the first surface 60 and the second surface 62). Referring to FIG. 7, the second working volume 49 may be at least partially defined by the second surface 46 of the piston head 42 and a portion of the piston cavity 32 extending along the body axis 24 between the second surface 46 of the piston head 42 and the second end 36 of the piston cavity 32. The second working volume 49 may also be partially defined by the cavity end wall 92 of the piston volume 32. The second working volume 49 may also be partially defined by a volume defined by (or within) the piston cavity inlet 47 (i.e., a volume between the cavity end wall 92 of the piston volume 32 and the end wall 96 of the body cavity 22).

In use, process pressure may be communicated to the sensing cavity 30 by, for example, a sensing passage 31, as illustrated in FIG. 1. The sensing passage 31 may have a first end 31a in fluid communication with the inlet 14, as illustrated in FIG. 1, and a second end 31b of the sensing passage 31 may be in fluid communication with the sensing cavity 30. As previously explained, a regulator (not shown) may be disposed between the first end 31a and the second end 31b of the sensing passage 31 such that pressure in the sensing cavity 30 is less than (but proportional to) pressure at the inlet 14. Also as explained earlier, the sensing cavity 30 may be in fluid communication with a source of fluid independent of the process fluid flowing from the inlet 14 to the outlet 16 of the valve body 12. In other embodiments, the first end 31a of the sensing passage 31 may be in fluid communication with the outlet 16, with a portion of the process upstream of the inlet 14, and/or with a portion of the process downstream of the outlet 16, and a regulator be disposed between the first end 31a and the second end 31b of the sensing passage 31. Pressure within the sensing cavity 30 may be communicated to the piston cavity 32 (and, more specifically, to the first working volume 48) by way of the at least one baffle apertures 64 extending through the baffle plate 58. In addition, the second working volume 49 of the piston cavity 32 may be in fluid communication with the body cavity 22 (e.g., a portion 51 of the body cavity 22 in fluid communication with the outlet 16) by the piston cavity inlet 47.

Pressure in the sensing cavity 30 transmitted and/or communicated to the first working volume 48 of the piston cavity 32 acts on the first surface 44 of the piston head 42 of the piston 40. In addition, pressure in the second working volume 49 provides a force acting on the second surface 46 of the piston head 42. If the downward force on the first surface 44 of the piston head 42 of the piston 40 is greater than the (a) upward force acting on the second surface 46 of the piston head 42 and (b) the upward biasing force acting on the second end 68 of the valve plug 20 by the resilient member 74, the piston 40 is downwardly displaced towards the valve plug 20 and/or the valve seat 28 and away from the bonnet 29. Because the second end 56 of the piston stem 50 is in contact with the first end 67 of the valve plug 20, the sealing surface 26 of the valve plug 20 is displaced away from the sealing surface 28 of the valve seat 18, thereby moving the valve plug 20 into an open position in which the sealing surface 26 of the valve plug 20 is offset from the sealing surface 28 of the valve seat 18. The valve plug 20 is maintained in engagement with the second end 56 of the piston stem 50 by the resilient member 74 acting on the second end 68 of the valve plug 20. In the fully open position of the valve plug 20.

If the downward force on the first surface 44 of the piston head 42 of the piston 40 continues to be greater than the (a) upward force acting on the second surface 46 of the piston head 42 and (b) the upward biasing force acting on the second end 68 of the valve plug 20 by the resilient member 74, the piston 40 is downwardly displaced towards the valve plug 20 and/or the valve seat 28 into the fully-open position of FIG. 2. In this fully-open position, the second surface 46 of the piston head 42 may contact the cavity end wall 92 (illustrated in FIG. 6) of the piston cavity 32 to act as a hard stop to prevent further downward displacement of the piston 40.

If the downward force on the first surface 44 of the piston head 42 of the piston 40 is less than the (a) upward force acting on the second surface 46 of the piston head 42 and (b) the upward biasing force acting on the second end 68 of the valve plug 20 by the resilient member 74, the piston 40 is upwardly displaced away from the valve plug 20 and/or the valve seat 28 and towards the bonnet 29. This upward movement of the piston 40 and the upward biasing force of the resilient member 74 results in an upward movement of the valve plug 20 such that the sealing surface 26 of the valve plug 20 is displaced towards the sealing surface 28 of the valve seat 18. If the pressure in the first working volume 48 is below a critical value (for a suitable period of time), the piston 40 will upwardly displace until the valve plug 20 is in the closed position of FIG. 1 in which the sealing surface 26 of the valve plug 20 sealing engages the sealing surface 28 of the valve seat 18. In this fully-closed position, the first surface 44 of the piston head 42 may contact the second surface 62 (illustrated in FIG. 6) of the baffle plate 58 to act as a hard stop to prevent further upward displacement of the piston 40.

As previously explained, when large pressure increases are communicated to the second working volume 49 due to variations in high flow rates at the outlet 16 (and the force from pressure in the second working volume 49 is much greater than the force from pressure in the first working volume 48), the pressure increase in the second working volume 49 applies a corresponding force to the second surface 46 of the piston head 42 that tends to bias or force the piston head 42 upwards. During such upward movement of the piston head 42, the at least one baffle aperture 64 acts to restrict or limit the flow of fluid from the first working volume 48 of the piston cavity 32 into the sensing cavity 30 to provide a volume or cushion of fluid that dampens the upward movement of the piston head 42 of the piston 40. In addition, when large pressure decreases are communicated to the second working volume 49 due to variations in high flow rates at the outlet 16 (and the force from pressure in the second working volume 49 is much less than the force from pressure in the first working volume 48), the at least one baffle aperture 64 acts to restrict, limit, and/or delay the flow of fluid from the sensing cavity 30 into first working volume 48 of the piston cavity 32 to limit or delay the corresponding force acting on the first surface 44 of the piston head 42 of the piston 40. Accordingly, extreme oscillations due to pressure variations at the outlet 16 acting on the piston head 42 of the piston 40 causing the piston 40 (and valve assembly 10) to go unstable are eliminated.

While various embodiments have been described above, this disclosure is not intended to be limited thereto. Variations can be made to the disclosed embodiments that are still within the scope of the appended claims.

What is claimed is:

1. A method of assembling a valve assembly, the valve assembly including: a valve body having an inlet, an outlet, and a valve seat disposed between the inlet and outlet; a valve plug movably disposed within a body cavity defined in the valve body, the body cavity being disposed between the inlet and the outlet, a sensing cavity defined in the valve body or in a bonnet coupled to the valve body, and in fluid communication with the inlet of the valve body such that, when in use, a pressure in the sensing cavity is proportional to a pressure in the inlet; and a piston cavity defined in the valve body or in the bonnet coupled to the valve body, the piston cavity extending from a first end to a second end along the body axis, the piston cavity being partially defined by a cavity side wall that extends from the first end to the second end of the piston cavity, the method comprising:

disposing a piston head of a piston within the piston cavity, the piston head having a first surface and a second surface, the piston head sealingly engaging the cavity side wall of the piston cavity, wherein a first working volume is defined by the first surface of the piston head and a portion of the piston cavity extending along the body axis between the first end of the piston cavity and the first surface of the piston head, the piston including a piston stem that extends along a piston axis from a first end to a second end, the first end of the piston stem being coupled to the piston head and the second end of the piston stem being disposed within the body cavity;

disposing a baffle plate between the sensing cavity and the piston cavity, the baffle plate having a first surface and a second surface, wherein the first surface of the baffle plate defines a portion of the sensing cavity and the second surface of the baffle plate defines a portion of the piston cavity, wherein the baffle plate includes a plurality of baffle apertures extending between the first and second surfaces thereof such that the sensing cavity is in fluid communication with the first working volume of the piston cavity such that pressure in the sensing cavity that is communicated to the first working volume of the piston cavity acts on the first surface of the piston head of the piston to displace the piston towards the valve plug, thereby displacing a sealing surface of the valve plug away from a sealing surface of the valve seat, and wherein the plurality of baffle apertures are adapted to restrict the flow of fluid between the sensing cavity and the first working volume.

2. The method of claim 1, wherein a second working volume is at least partially defined by the second surface of the piston head and a portion of the piston cavity extending along the body axis between the second surface of the piston head and the second end of the piston cavity, wherein the second working volume of the piston cavity is in fluid communication with the body cavity, and wherein the piston head sealingly engages the cavity side wall of the piston cavity to seal the first working volume from the second working volume.

3. The method of claim 1, wherein disposing the baffle plate between the sensing cavity and the piston cavity includes removably disposing the baffle plate between the sensing cavity and the piston cavity.

4. The method of claim 1, wherein the baffle plate has a round perimeter edge and has the shape of a disc, and wherein a diameter of each of the plurality of baffle apertures is less than 10% of a diameter of the perimeter edge of the baffle plate.

5. The method of claim 1, wherein when the valve plug is in a closed position, the first surface of the piston head of the piston is in contact with or immediately adjacent to the second surface of the baffle plate.

6. The method of claim 1, further comprising placing the sensing cavity in fluid communication with at least one of the inlet or the outlet.

7. A valve assembly comprising:
a valve body having an inlet, an outlet, and a valve seat disposed between the inlet and outlet;
a valve plug movably disposed within a body cavity defined in the valve body, the body cavity being disposed between the inlet and the outlet, the valve plug displaceable along a body axis between a closed position in which a sealing surface of the valve plug sealingly engages a sealing surface of the valve seat and a fully-open position in which the sealing surface of the valve plug is offset from the sealing surface of the valve seat;

a sensing cavity defined in the valve body or in a bonnet coupled to the valve body, the sensing cavity in fluid communication with the inlet of the valve body such that, when in use, a pressure in the sensing cavity is proportional to a pressure in the inlet;

a piston cavity defined in the valve body or in the bonnet coupled to the valve body, the piston cavity extending from a first end to a second end along the body axis, the piston cavity being partially defined by a cavity side wall that extends from the first end to the second end of the piston cavity;

a piston having a piston head disposed within the piston cavity, the piston head having a first surface and a second surface, the piston head sealingly engaging the cavity side wall of the piston cavity, wherein a first working volume is defined by the first surface of the piston head and a portion of the piston cavity extending along the body axis between the first end of the piston cavity and the first surface of the piston head, the piston including a piston stem that extends along a piston axis from a first end to a second end, the first end of the piston stem being coupled to the piston head and the second end of the piston stem being disposed within the body cavity;

a baffle plate disposed between the sensing cavity and the piston cavity, the baffle plate having a first surface and a second surface, wherein the first surface of the baffle plate defines a portion of the sensing cavity and the second surface of the baffle plate defines a portion of the piston cavity, wherein the baffle plate includes a plurality of baffle apertures extending between the first and second surfaces thereof such that the sensing cavity is in fluid communication with the first working volume of the piston cavity such that pressure in the sensing cavity that is communicated to the first working volume of the piston cavity acts on the first surface of the piston head of the piston to displace the piston towards the valve plug, thereby displacing the sealing surface of the valve plug away from the sealing surface of the valve seat, and wherein the plurality of baffle apertures are adapted to restrict the flow of fluid between the sensing cavity and the first working volume.

8. The valve assembly of claim 7, wherein a second working volume is at least partially defined by the second surface of the piston head and a portion of the piston cavity extending along the body axis between the second surface of the piston head and the second end of the piston cavity, wherein the second working volume of the piston cavity is in fluid communication with the body cavity.

9. The valve assembly of claim 8, wherein the piston head sealingly engages the cavity side wall of the piston cavity to seal the first working volume from the second working volume.

10. The valve assembly of claim 7, wherein the baffle plate is removably disposed between the sensing cavity and the piston cavity.

11. The valve assembly of claim 7, wherein the baffle plate has a round perimeter edge and has the shape of a disc.

12. The valve assembly of claim 11, wherein a diameter of each of the plurality of baffle apertures is less than 10% of a diameter of the perimeter edge of the baffle plate.

13. The valve assembly of claim 7, wherein the piston axis is co-axially aligned with the body axis.

14. The valve assembly of claim 7, wherein a spring acts on a bottom portion of the valve plug to bias a top portion of the valve plug into contact with the second end of the piston stem of the piston or to bias the sealing surface of the valve plug into sealing engagement with the sealing surface of the valve seat.

15. The valve assembly of claim 7, wherein when the valve plug is in the closed position, the first surface of the piston head of the piston is in contact with or immediately adjacent to the second surface of the baffle plate.

16. The valve assembly of claim 7, wherein the sensing cavity is in fluid communication with at least one of the inlet or the outlet.

* * * * *

UNITED STATES PATENT AND TRADEMARK OFFICE
CERTIFICATE OF CORRECTION

PATENT NO. : 10,386,868 B2  
APPLICATION NO. : 15/199137  
DATED : August 20, 2019  
INVENTOR(S) : Jacob T. R. Renollett et al.

Page 1 of 1

It is certified that error appears in the above-identified patent and that said Letters Patent is hereby corrected as shown below:

In the Specification

At Column 4, Line 3, "piston volume 32" should be -- piston cavity 32 --.

At Column 5, Line 10, "bonnet 20" should be -- bonnet 29 --.

At Column 6, Line 21, "piston volume 32." should be -- piston cavity 32. --.

At Column 6, Line 44, "first end 66" should be -- first end 67 --.

At Column 7, Lines 65-66, "piston volume 32." should be -- piston cavity 32. --.

At Column 8, Line 2, "piston volume 32." should be -- piston cavity 32. --.

At Column 8, Line 44, "valve seat 28" should be -- valve seat 18 --.

At Column 8, Line 62, "valve seat 28" should be -- valve seat 18 --.

At Column 9, Line 7, "valve seat 28" should be -- valve seat 18 --.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*